A. E. L. SCANES AND A. W. CLARKE.
GAUGE FOR INDICATING THE EFFICIENCY OF STEAM CONDENSERS.
APPLICATION FILED MAY 25, 1920.
1,406,088.
Patented Feb. 7, 1922.
2 SHEETS—SHEET 1.
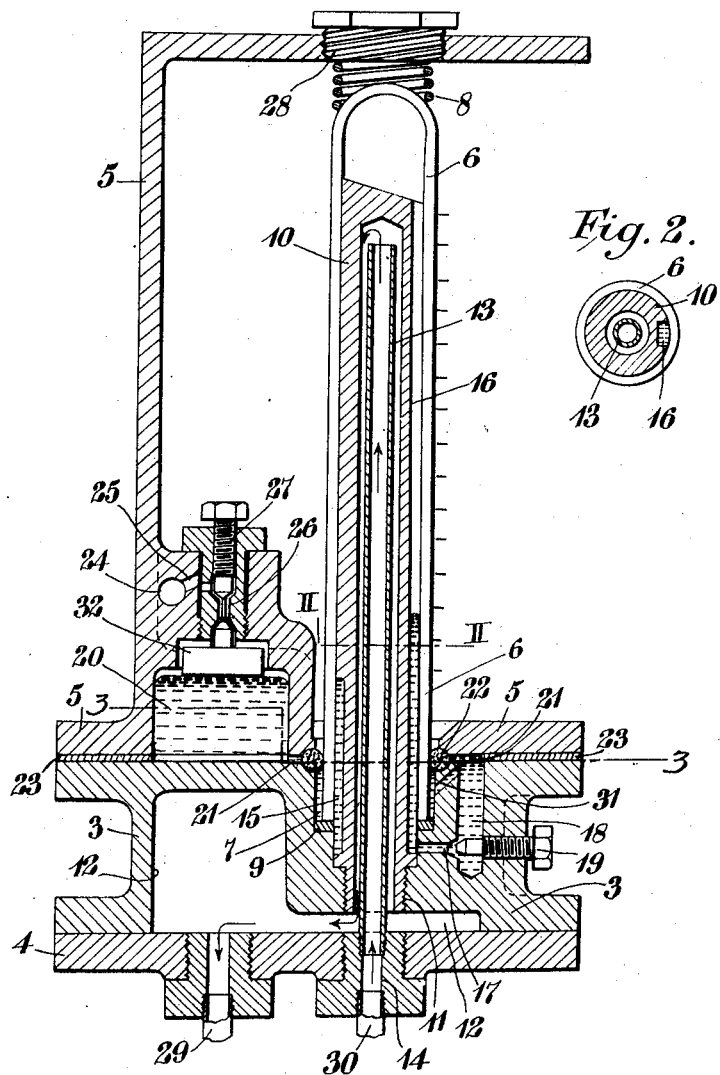
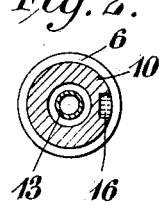

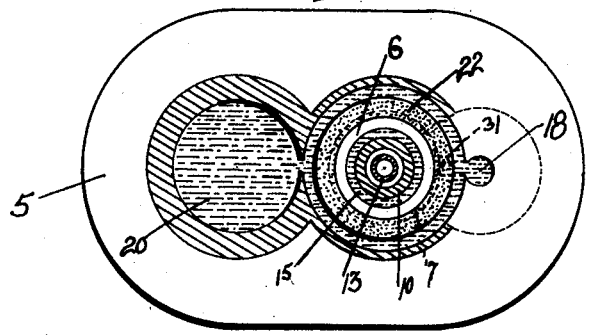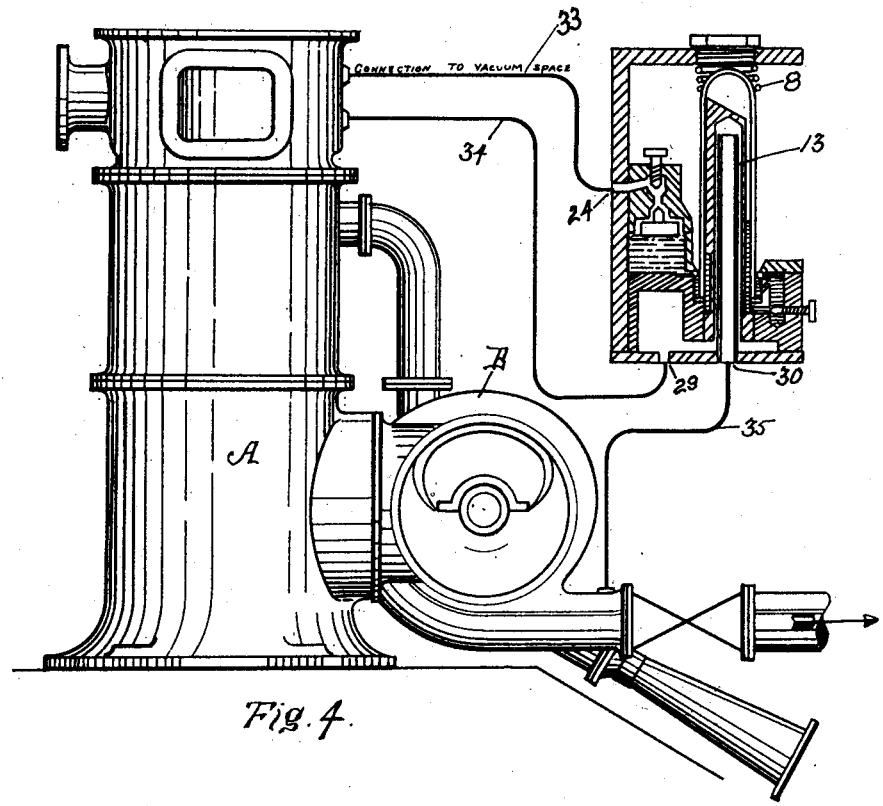

UNITED STATES PATENT OFFICE.

ARTHUR EDWIN LEIGH SCANES, OF ASHTON-ON-MERSEY, AND ATHOL WILFRID CLARKE, OF MANCHESTER, ENGLAND.

GAUGE FOR INDICATING THE EFFICIENCY OF STEAM CONDENSERS.

1,406,088.

Specification of Letters Patent.   Patented Feb. 7, 1922.

Appilcation filed May 25, 1920. Serial No. 384,190.

*To all whom it may concern:*

Be it known that we, ARTHUR EDWIN LEIGH SCANES, a subject of the King of Great Britain, and a resident of Ashton-on-Mersey, in the county of Chester, England, and ATHOL WILFRID CLARKE, a subject of the King of Great Britain, and a resident of Manchester, in the county of Lancaster, England, have invented a new and useful Improvement in Gauges for Indicating the Efficiency of Steam Condensers, of which the following is a specification.

This invention relates to gauges for indicating directly the efficiency of a steam condenser of the type described in the specification of American Patent 1217074, dated 20th February 1917. The liquid in the sealed indicating tube of a gauge of the type therein described is maintained at the desired temperature by immersing the tube in a container or surrounding it by a jacket through which either the condensed steam water or the cooling water of the circulating system of the condenser is caused to pass.

It has been found with gauges constructed in this manner that the glass of the container or jacket after being in use for some time becomes obscured by impurities deposited from the water circulating through the container or jacket which renders it difficult to read the indications given by variations in the level of the liquid in the sealed tube.

The present invention has for its object to provide an improved construction of gauge of the character indicated in which the above mentioned difficulty is overcome and the instrument may be read with ease and accuracy even after prolonged use.

According to this invention the condensed steam water or circulating water of the condenser is caused to flow inside the sealed indicating or gauge tube of the instrument instead of, as in the gauges hitherto constructed, through a jacket or container surrounding said tube.

In order that the nature of the invention may be clearly understood one method in which the same may be carried into effect will now be shortly described by way of example.

In the accompanying drawing Fig. 1 is a sectional elevation illustrating a gauge constructed in accordance with the invention, and Fig. 2 is a section on the line II—II, Fig. 1.

Figure 3 is a sectional view taken along the line 3—3 of Figure 1.

Figure 4 is a diagrammatic view of the gauge connected in operative relation to a condenser.

The main body 3 of the gauge conveniently formed of a casting, is secured to a supporting base 4 and has mounted on its upper side a casing or framework 5. 6 is a tube of glass or other suitable transparent material sealed at the top as shewn and mounted in a recess 7 in the upper part of the body 3, the end of the tube being pressed by means of a spring 8 against an annular gasket 9 in the bottom of the recess 7 so as to make a tight joint therewith. Within the tube 6 and closely fitting therein is another tube 10 preferably of metal, steel for example, also sealed at the top as shewn and screwed into an orifice 11 in the body 3, the interior of said tube communicating with a recess 12 formed in said body. Within the tube 10 is a smaller tube 13 open at the top and screwed into an orifice 14 in the base 4, an annular space being provided between the tubes 10 and 13 as shewn. The tube 10 is provided near its lower end with a circumferential groove 15 which communicates at the top with a longitudinal groove 16 in the side of said tube 10 and at the bottom by a channel 17 with a receptacle 18 in the body 3. The connection between the channel and the receptacle may be closed when necessary by means of a needle valve 19. In the casing 5 a receptacle 20 is provided which communicates by means of an annular channel 21 between said casing and the body 3 with the receptacle 18 aforementioned. A tight joint is provided between the upper edge of the recess 7, the tube 6 and the edge of the orifice in the casing 5 through which said tube passes by means of a ring or gasket 22, which ring also forms the inner circumferential boundary of the channel 21, and a gasket 23 is provided between the casing 5 and the body 3 so as to permit these parts being brought tightly together, thereby ensuring the tightness of the ring 22. In the casing 5 is provided a channel 24 which communicates through channels 25, 26 with the upper part of the receptacle 20, a needle valve 27 being provided by means of which the communication may be closed at will. 28 is an orifice in the upper part of the casing 5 through which the various tubes may be introduced into position, said orifice being normally closed by a plug forming an abutment for the spring 8. Communication can be established by means of the tube 29 with the recess 12 and the annular space between the tubes 10 and 13, and by means of the tube 30 with the tube 13.

The receptacle 20, the annular channel 21, the receptacle 18, the circumferential groove 15 and the lower part of the groove 16 are supplied with mercury. The upper part of the groove 16 and the space within the upper part of the tube 6 are exhausted of air and a suitable small quantity or film of water (not shown in the drawings) is provided above the mercury in the groove 16, the purpose of which is to have at all times aqueous vapor in the tube 6 when the small quantity of water in said tube is heated by the passage of water to the condenser through the tube 10. The space between the gasket 9 and the ring 22 outside the tube 6 may be filled with mercury from the receptacle 18 by the channel 31 so as to provide a mercury seal between the tube and the body 3 and a float 32 is placed on the top of the mercury in the receptacle 20, the upper end of said float being adapted to close the channel 26 in certain circumstances as hereinafter explained.

It will be readily seen from the above description taken in conjunction with the drawing that the tube 6 in conjunction with the groove 16 forms the sealed leg and the receptacle 20 forms the open leg of a U-shaped gauge tube as described in the specification hereinabove referred to and further that as the heating water circulates inside the gauge tube instead of outside no obscuration of the gauge tube will take place.

In using the apparatus the channel 24 is connected with the vacuum space of the condenser A, the efficiency of which is to be tested by means of the tube 33, and condensed steam water or if desired circulating water in the case of a surface condenser, is supplied to the tube 30 by the tube 35 and is caused to flow up the tube 13 and down the annular space between the tubes 13 and 10 leaving the apparatus by the tube 29 which is connected to the condenser by the tube 34. Under these conditions the difference of level between the mercury in the groove 16 and in the receptacle 20 will indicate the vacuum or condenser efficiency in the manner described in the specification hereinbefore referred to. A scale may be marked on the glass 6 opposite the groove 16 or a separate scale may be applied thereto shewing the percentage efficiency of the condenser.

The valves 19 and 27 are closed when necessary in order to prevent the mercury from being displaced during transit of the instrument and the float 32 acts as a non-return valve and closes the end of the channel 26 so as to prevent the overflow of mercury should the temperature of the water circulating within the tube 10 increase above the theoretical temperature due to the vacuum in the channel 24, thereby causing a tendency for all the mercury to be driven out of the groove 16 and circumferential groove 15.

The casing 5 or framework may be provided with a glass front if desired, this however not being shewn in the drawing.

Although a convenient and desirable construction of gauge has been herein described and shewn in the drawings, it will be understood that this is by way of example only and that the invention is not limited to the particular form described.

We claim as our invention:—

1. In a device for indicating the efficiency of a steam condenser the combination of a reservoir adapted to contain mercury, a vertical tube closed at its upper end and exhausted of air, a connecting passageway between the lower end of said vertical tube and the mercury reservoir, and means for circulating water within the vertical tube without contact therewith.

2. In a device for indicating the efficiency of a steam condenser the combination of a reservoir containing mercury, a vertical tube closed at its upper end containing water and exhausted of air, a connecting passageway between said vertical tube and the mercury reservoir, means for circulating water within the vertical tube out of contact therewith, and means whereby heat from the circulating water may be communicated to the water and vapour in the vertical tube.

3. In a device for indicating the efficiency of a steam condenser the combination of a vertical tube closed at its upper end and exhausted of air, a reservoir connected with the lower part of the vertical tube, a connection between said reservoir and a condenser, a second tube closed at its upper end within said vertical tube, a mercury seal in the space between said tubes, and in said reservoir and a third tube open at both ends within said second tube so that liquid may be circulated through said third tube and the space between the third tube and the second tube without contact with the first-mentioned vertical tube.

4. In a device for indicating the efficiency of a steam condenser, a vertical tube closed at its upper end and exhausted of air, a reservoir connected with the lower part of the vertical tube, a connection between said reservoir and a condenser, a second tube closed at its upper end fitting within said vertical tube having an annular groove at its lower end and a vertical groove extending from said annular groove to the top of said tube, and a quantity of mercury in the annular groove between the two tubes, and in said reservoir, the mercury extending up the vertical groove.

5. In a device for indicating the efficiency of a steam condenser, a vertical tube closed at its upper end and exhausted of air, a reservoir connected with the lower part of the vertical tube, a connection between said reservoir and a condenser, a second tube closed at its upper end fitting within said vertical tube having an annular groove at its lower end and a vertical groove extending from said annular groove to the top of said tube, and means for circulating liquid within said second tube and out of contact with the first tube.

6. The combination with a steam condenser, of a sealed U-tube containing water and having its open end connected with the vacuum space in the condenser, and means for circulating water from the condenser within said tube without contact with the water or vapour inside of said tube.

7. The combination with a steam condenser, of a vertical tube containing water closed at its upper end and exhausted of air, a reservoir containing mercury and connected with the lower part of the vertical tube whereby the mercury forms a seal, a connection between the reservoir and the vacuum space of the condenser, and means for circulating water from the condenser within said vertical tube without contact with the water and vapour inside of said tube.

8. The combination with a steam condenser, of a vertical tube containing water closed at its upper end and exhausted of air, a reservoir containing mercury and connected with the lower part of the vertical tube whereby the mercury forms a seal, a connection between the reservoir and the vacuum space of the condenser, a non-return valve in said connection which prevents mercury flowing from the reservoir to the condenser, and means for maintaining the water in the vertical tube at a temperature equal to that of the water in the condenser.

9. The combination with a steam condenser, of a vertical tube containing water closed at its upper end and exhausted of air, a reservoir containing mercury and connected with the lower part of the vertical tube whereby the mercury forms a seal, a connection between the reservoir and the vacuum space of the condenser, and a float supported on the surface of the mercury in the reservoir adapted to close the connection to the condenser when the level of mercury in the reservoir rises above a predetermined limit.

10. The combination with a steam condenser, of a U-tube with a closed end containing water and exhausted of air, a mercury seal between the open end and the closed end of the tube, a connecting conduit between the vacuum space of the condenser and the open end of the U-tube, a non-return valve in said connection, and means for maintaining the water in the closed end of the U-tube at a temperature equal to that of the water in the condenser.

In testimony whereof we have hereunto subscribed our names this tenth day of May, 1920.

ARTHUR EDWIN LEIGH SCANES.
ATHOL WILFRID CLARKE.